US010021185B1

(12) United States Patent
Kleinschnitz, Jr. et al.

(10) Patent No.: US 10,021,185 B1
(45) Date of Patent: *Jul. 10, 2018

(54) OPTIMIZED VIRTUAL STORAGE FABRIC

(71) Applicant: CA, INC., New York, NY (US)

(72) Inventors: Donald Joseph Kleinschnitz, Jr., Islandia, NY (US); Debra Jean Danielson, Islandia, NY (US)

(73) Assignee: CA, Inc., New York, NY (US)

( * ) Notice: Subject to any disclaimer, the term of this patent is extended or adjusted under 35 U.S.C. 154(b) by 1016 days.

This patent is subject to a terminal disclaimer.

(21) Appl. No.: 13/973,578

(22) Filed: Aug. 22, 2013

(51) Int. Cl.
  *G06F 9/50* (2006.01)
  *H04L 29/08* (2006.01)
  *G06F 17/30* (2006.01)

(52) U.S. Cl.
  CPC ........... *H04L 67/1097* (2013.01); *G06F 9/50* (2013.01); *G06F 9/5072* (2013.01); *G06F 17/30221* (2013.01)

(58) Field of Classification Search
  CPC ... H04L 67/1095; H04L 67/1097; G06F 9/50; G06F 9/5052; G06F 9/5072; G06F 17/30221
  USPC .................... 709/203, 217; 711/117; 718/104
  See application file for complete search history.

(56) References Cited

U.S. PATENT DOCUMENTS

| | | | | |
|---|---|---|---|---|
| 8,341,345 | B2* | 12/2012 | Tulskie | G06F 3/0605 711/100 |
| 8,370,312 | B1* | 2/2013 | Sawhney | H04L 67/1097 707/694 |
| 8,612,284 | B1* | 12/2013 | Sharif et al. | 705/7.35 |
| 9,317,223 | B2* | 4/2016 | Reohr | G06F 3/067 |
| 2003/0135385 | A1* | 7/2003 | Karpoff | G06F 12/08 705/34 |
| 2010/0332401 | A1* | 12/2010 | Prahlad | G06F 17/30082 705/80 |
| 2011/0153727 | A1* | 6/2011 | Li | G06F 9/5055 709/203 |
| 2012/0185413 | A1* | 7/2012 | Felter | G06Q 30/0283 705/400 |
| 2012/0198151 | A1* | 8/2012 | Kato et al. | 711/114 |
| 2012/0323821 | A1* | 12/2012 | Crk et al. | 705/400 |
| 2013/0080703 | A1* | 3/2013 | Kumagai | G06F 9/5072 711/117 |
| 2014/0059559 | A1* | 2/2014 | Alatorre | G06F 9/50 718/104 |

(Continued)

*Primary Examiner* — Ranodhi Serrao
*Assistant Examiner* — James Fiorillo
(74) *Attorney, Agent, or Firm* — Baker Botts L.L.P.

(57) ABSTRACT

The disclosed embodiments included a system, apparatus, method, and computer program product for optimizing the storage of data based at least in part on cost and service levels utilizing a cloud-based virtual storage fabric. Those embodiments are configured to compile operational information for service offerings that provide data storage at different storage locations, determine the costs of migrating that data to and storing that data at each of those storage locations utilizing the operational information, designate at which storage location each datum is to be stored based in part on those costs, and designate at least one datum for migration from one of the storage locations to another if the cost of storing that datum at that storage location is determined to be greater than the costs of migrating and storing that datum at the other storage location.

18 Claims, 4 Drawing Sheets

(56) References Cited

U.S. PATENT DOCUMENTS

| | | | |
|---|---|---|---|
| 2014/0173232 A1* | 6/2014 | Reohr | G06F 3/0611 |
| | | | 711/162 |
| 2014/0325151 A1* | 10/2014 | Kim et al. | 711/117 |
| 2014/0325152 A1* | 10/2014 | Taft | G06F 12/0875 |
| | | | 711/122 |
| 2015/0381723 A1* | 12/2015 | Sancheti | G06F 3/065 |
| | | | 709/217 |
| 2016/0105504 A1* | 4/2016 | Vallabhaneni | H04L 67/1095 |
| | | | 709/217 |

\* cited by examiner

OPTIMIZED VIRTUAL STORAGE FABRIC

BACKGROUND

The present disclosure generally relates to data management. The disclosed embodiments relate more specifically to a system, apparatus, method, and computer program product for optimizing the storage of data based on cost and service levels utilizing a cloud-based virtual storage fabric.

The volume of data generated by individuals, enterprises, and organizations is growing at a frenetic pace. Traditionally, such entities have purchased more local storage as the volume of data that needed to be stored increased. Such a response to increased storage needs was possible because the cost of storage devices was dropping almost as fast as the size of storage needs was increasing. The cost of such data storage was, for example, the amortized cost of the corresponding storage device.

In an effort to manage such storage devices more efficiently, a policy-based management technique was developed that separates different types of storage devices (e.g., hard disk drive arrays, optical storage, tape storage, etc.) into different hierarchies that correspond to different levels of cost and retrieval speeds. That technique, which is referred to as Hierarchical Storage Management (HSM), involves storing data that is used more frequently on storage devices with higher retrieval speeds (e.g., hard disk drive arrays), while data that is used less frequently is migrated to storage devices with lesser retrieval speeds (e.g., tape storage). Nevertheless, storage devices with higher retrieval speeds generally cost more than storage devices with lesser retrieval speeds. Accordingly, HSM was utilized to reduce the costs of local storage solutions by allowing slower, less costly storage devices to be utilized to handle a majority of the data storage while only utilizing fast, more costly storage devices to handle the data that is currently and/or frequently being used.

More recently, entities have begun relying on cloud IT services for their data storage needs. Such services eliminate the need to purchase and maintain storage devices locally. Thus, rather than making their own efforts store data more efficiently, such as by utilizing HSM techniques, entities depend on the cloud IT service providers to adopt the appropriate techniques to reduce their storage costs. Moreover, cloud IT service providers typically charge their tenants on a month-by-month basis. Thus, rather than being able to amortize the costs of data storage over a finite period of time, those costs will continue perpetually as long as the need for storage persists.

BRIEF SUMMARY

The present disclosure is directed to system, apparatus, method, and computer program product for optimizing the storage of data based at least in part on cost and service levels utilizing a cloud-based virtual storage fabric. The method comprises compiling operational information for a plurality of service offerings, the plurality of service offerings being configured to provide data storage at a plurality of storage locations; determining a cost of migrating each of a plurality of data to each of the plurality of storage locations utilizing the operational information; determining a cost of storing each of the plurality of data at each of the plurality of storage locations utilizing the operational information; designating at which of the plurality of storage locations each of the plurality of data is to be stored based on the cost of migrating each of a plurality of data to each of the plurality of storage locations and the cost of storing each of the plurality of data at each of the plurality of storage locations; and migrating at least one of the plurality of data from a first location of the plurality of storage locations to a second location of the plurality of storage locations if the cost of storing the at least one data at the first storage location is determined to be greater than the cost of migrating the at least one data to the second storage location and the cost of storing the at least one data at the second storage location.

BRIEF DESCRIPTION OF THE DRAWINGS

Aspects of the present disclosure are illustrated by way of example and are not limited by the accompanying figures.

In those figures, like reference numerals refer to like parts, components, structures, and/or processes.

DETAILED DESCRIPTION

Figure 1:
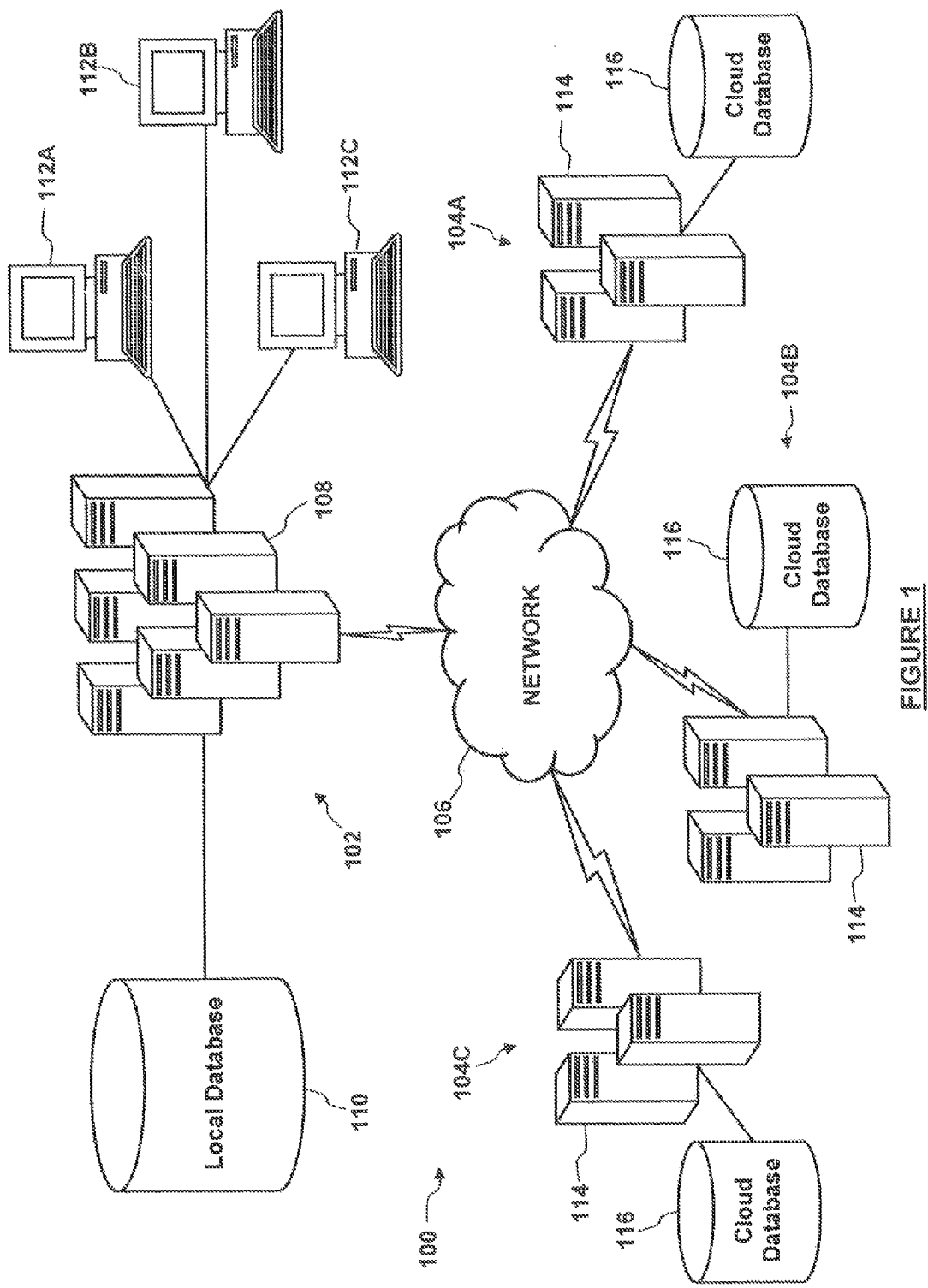
FIG. 1 is a schematic diagram illustrating an example of a cloud IT service solution according to a non-limiting embodiment of the present disclosure.

As will be appreciated by those of ordinary skill in the art, aspects of the present disclosure may be illustrated and described herein in any of a number of patentable classes or contexts that may include any new and useful process, machine, manufacture, or composition of matter, or any new and useful improvement thereof. Accordingly, aspects of the present disclosure may be implemented entirely as hardware, entirely as software (including firmware, resident software, micro-code, etc.), or by combining software and hardware implementations that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, radio frequency (RF), or any suitable combination thereof.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like; conventional procedural programming languages, such as the "C" programming language, Visual Basic, Fortran 2003, Perl, COBOL 2002, PHP, ABAP, dynamic programming languages such as Python, Ruby and Groovy; or other programming languages.

Further, that compute program code may comprise or invoke one or more applications written in any combination of one or more of those programming languages. For example, the computer program code of the present disclosure may comprise or invoke various distributed computing applications, such as Hadoop and MapReduce.

The computer program code may be executed entirely on a user's computer, partly on the user's computer, as a stand-alone software package, partly on the user's computer and partly on a remote computer, or entirely on the remote computer or server. The remote computer or server may be connected to the user's computer through any type of network, including a local area network (LAN), a wide area network (WAN), or a cellular network. The connection also may be made to an external computer or server (e.g., through the Internet using an Internet Service Provider) in a cloud computing environment or offered as a service such as a Software as a Service (SaaS).

Aspects of the present disclosure are described herein with reference to schematic, block, and flow diagrams of systems, methods, apparatuses, and computer program products according to embodiments of the present disclosure. It will be understood that each block of the block and flow diagrams, and combinations of blocks in the block and flow diagrams, can be implemented by computer program instructions. Those computer program instructions may be provided to a processor of a general purpose computer, special purpose computer, or other programmable data processing apparatus to produce a machine, such that the instructions, which are executed via the processor of the computer or other programmable instruction execution apparatus, create a mechanism for implementing the functions/acts specified in the flowchart and/or block diagram block or blocks.

Those computer program instructions also may be stored in a computer-readable medium that, when executed, can direct a computer, other programmable data processing apparatus, or other devices to function in a particular manner, such that the instructions, when stored in the computer-readable medium, produce an article of manufacture that includes instructions which, when executed, cause a computer to implement the function/act specified in the flowchart and/or block diagram block or blocks. The computer program instructions also may be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The system, apparatus, method, and computer program product of the disclosed embodiments provide functionality for optimizing the storage of data based on cost and service levels utilizing a cloud-based virtual storage fabric. Those embodiments utilize a variety of different analytic and semantic techniques that assign different classifications to different data, to discover and gather information about various cloud-based alternatives for storing that data, and to filter those alternatives based on those classifications (e.g., high/low security, high/low value, high/low uniqueness, etc.) and user-selected parameters (e.g., cost, size, time period, security, availability, location, performance attributes, etc.). Those embodiments then may order the various alternatives based on how strongly they correlate to those classifications and user-selected parameters, and store the subject data utilizing the storage alternative with the strongest correlation. The disclosed embodiments continuously gather and sort information about various cloud-based storage alternatives as those alternatives and their corresponding information changes. Accordingly, the disclosed embodiments may dynamically and autonomically monitor and modify the placement of data as required to optimize such things as the cost, security, and availability of stored data while ensuring that the data remains stored in accordance with the classifications that may be associated therewith.

Turning to the drawings, FIG. 1 illustrates a cloud IT service solution 100 according to a non-limiting embodiment of the present disclosure. The cloud IT service solution 100 comprises a tenant system 102 and three (3) service provider systems 104A-104C that are in electronic data communication with each other via a network connection 106. For example, the tenant system 102 and the service provider systems 104A-104C may be configured to communicate with each of the other via a WAN connection. Although only one (1) tenant system 102 and three (3) service provider systems 104A-104C are depicted in FIG. 1, it should be understood that the cloud IT service solution 100 depicted in FIG. 1 is illustrative only and may comprise any number of tenant systems 102 and/or service provider systems 104A-104C, as well as various other systems (e.g., third-party software provider systems, mobile communications systems, etc.). It also should be understood that the tenant system 102 and the service provider systems 104A-104C may comprise any number of each of their respective components 108-116, as well as additional components (e.g., modems, routers, load balancers, etc.).

Further, the components 108-116 within the tenant system 102 and the service provider systems 104A-104C may be configured to communicate with each other via a LAN connection, a wireless LAN (WLAN) connection, a WAN connection, a cellular network connection (e.g., a Global System for Mobile Communications (GSM) connection, a Code Division Multiple Access (CDMA) connection, a Long Term Evolution (LTE) connection, etc.), or any combination of two or more of those network connections 106.

Similarly, any of the components 108-112 within the tenant system 102 also may communicate with any of the components 114 and 116 within the service provider systems 104A-104C, and vice versa, via any combination of such network connections 106. It should be understood, however, that the tenant system 102, the service provider systems 104A-104C, and their respective components 108-116 may communicate with each other via any suitable communication protocol, not just those provided in the foregoing example.

The tenant system 102 is maintained by an individual, enterprise, and/or organization that requires data storage (hereinafter "a tenant"). And each of the service provider systems 104A-104C is maintained by a different cloud IT service provider that provides storage as a service (STaaS), either as primary storage, backup storage, staging storage, or some combination thereof. Although each of the service provider systems 104A-104C is maintained by a different cloud IT service provider, they provide heterogeneous sources of storage for the tenant system 102 and are abstracted within a single storage fabric from the tenant's perspective. Accordingly, the STaaS provided by the service provider systems 104A-104C is presented to the tenant as a single service with the details of actual data placement obscured. For example, a tenant may select certain parameters for data storage (e.g., time period of required storage, amount of required storage, service level required, etc.) as part of that single service, and that single service may autonomically migrate data between the different service provider systems 104A-104C in the background as required to maintain the storage parameters selected by the tenant as the classifications of data change, the requirements of the tenant change, and/or the service offerings of the cloud IT service providers change. Alternatively, all or part of data migration may be visible to the tenant so the tenant can observe such things as what, when, and where data is being migrated.

As depicted in FIG. 1, the tenant system 102 comprises a plurality of local servers 108, a local database 110, and three (3) tenant graphical user interfaces (GUIs) 112A-112C. As also depicted in FIG. 1, each of the service provider systems 104A-104C comprises a plurality of cloud servers 114 and a cloud database 116. The tenant system 102 may be configured as business solution that comprises various software applications that are configured to generate, modify, and access data as part of a business (e.g., email applications, scheduling applications, web browsing applications, word processing applications, etc.). And each of the service provider systems 104A-104C may be configured to provide STaaS to the tenant system 102 on a subscription basis, wherein each of the service provider systems 104A-104C may be configured to provide different levels of services and/or different subscriptions to the tenant system 102 in a self-service manner.

Each of the servers 108 and 114 within the cloud IT service solution 100 comprises a processor, a memory, and a network interface. The processor may include any number of suitable CPUs that are configured to execute computer program code embodied on the memory and to perform the various functions of those servers 108 and 114 described herein. The memory may include one or more types of memory (e.g., ROM, RAM, EEPROM, etc.) as required to store the computer program code executed by the processor and to support the execution of that code. And the network interface may include any number of suitable interfaces (e.g., modems, mobile browsers, wireless Internet browsers, etc.) that are configured to support communications with and between the various components 108-114 within the tenant system 102 and the service provider systems 104A-104C, as well as with and between those systems 102, 104A, 104B, and 104C.

Each of the databases 110 and 116 within the cloud IT service solution 100 comprises memory that is configured to store data records, files, and other objects for access by a database management system (DBMS). More specifically, both the local database 110 and the cloud databases 116 are configured to store data that may be generated, modified, and/or accessed via the tenant system 102. For example, that data may be generated, modified, and/or accessed by users at the tenant GUIs 112A-112C that are sending and receiving emails with email applications, creating calendar entries with scheduling applications, viewing and/or creating web content with web browsing applications, and/or creating, modifying, and accessing documents with word processing applications. Accordingly, the tenant servers 108 may comprise a DBMS that is configured to store, access, and manage such data on both the local database 110 and the cloud databases 116.

Each of the tenant GUIs 112A-112C within the tenant system 102 comprises a processor, a memory, an input device, an output device, and a network interface. The processor, memory, and network interface may be similar to those described above with respect to the servers 108 and 114. And the input device may include any number of suitable devices that are configured to receive input from a user (e.g., a keypad, a microphone, a camera, a retinal scanner, a print pad, an electronic receiver, a touch screen, etc.), while the output device may include any number of suitable devices that are configured to output data to a user in a meaningful manner (e.g., a display, a printer, a speaker, etc.). Accordingly, each of the tenant GUIs 112A-112C may be any suitable network device with each of those components (e.g., a personal computer, a tablet computer, a personal digital assistant (PDA), a smartphone, etc.). Although not depicted in FIG. 1, each of the service provider systems 104A-104C also may comprise one or more GUIs.

Figure 2:
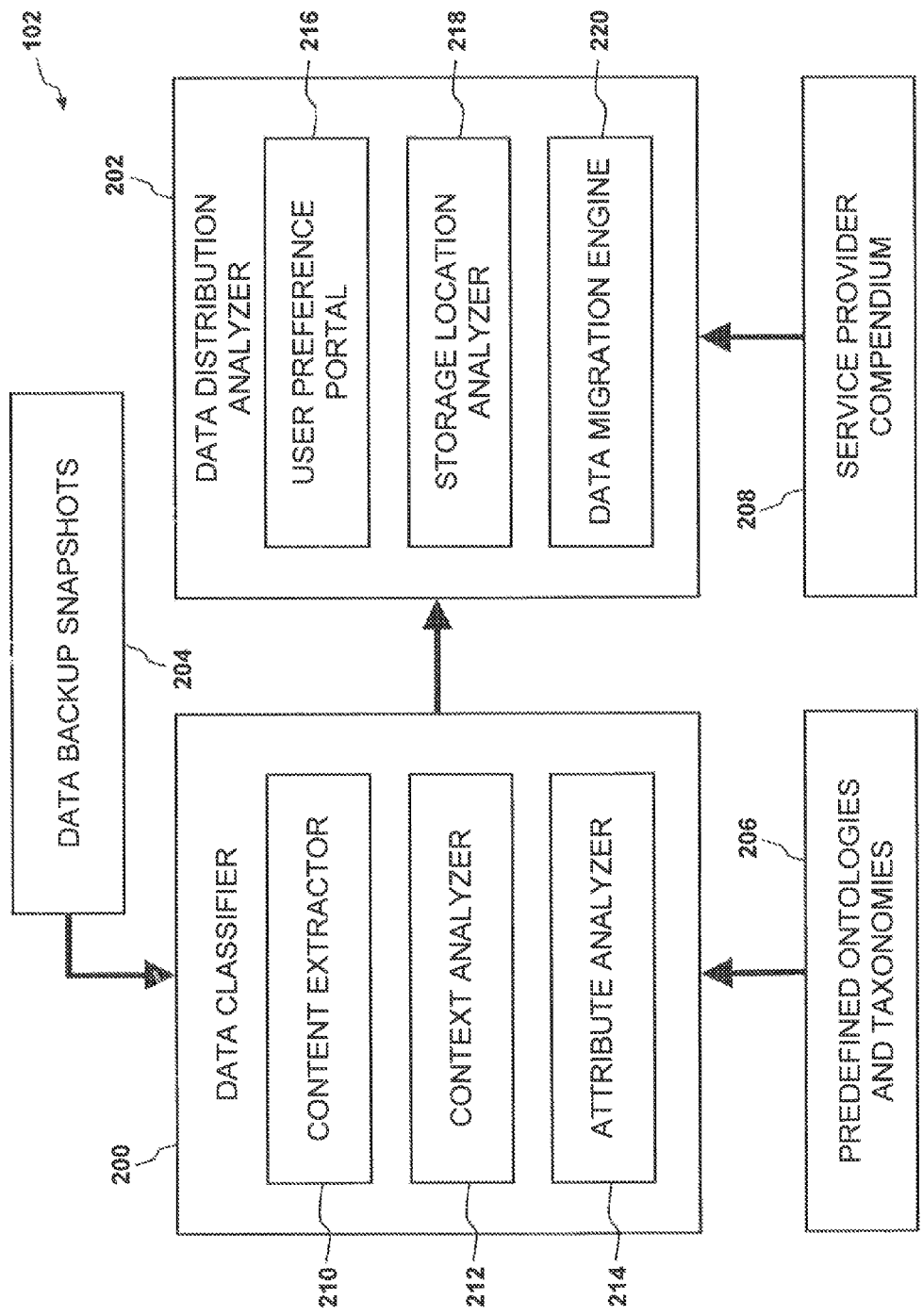
FIG. 2 is a block diagram illustrating a tenant system according to a non-limiting embodiment of the present disclosure.

Computer program code stored on and/or executed by one or more of the components 108-112 of the tenant system 102 may embody one or more modules that are configured to optimize the placement of the data generated at the tenant system 102 by utilizing local storage in conjunction with storage at the service provider systems 104A-104C. As depicted in FIG. 2, for example, the tenant system 102 may comprise a data classifier 200, a data distribution analyzer 202, data backup snapshots 204, predefined ontologies and taxonomies 206, and a service provider compendium 208. The data classifier 200 is configured to extract information from data and to classify that data based on its content, context, and history utilizing the extracted information, the data backup snapshots 204, and the predefined ontologies and taxonomies 206. The data distribution analyzer 202 is configured to determine whether and how to store that data utilizing the classifications assigned to that data by the data classifier 202 together with the service provider compendium 208.

The data classifier 200 comprises a content extractor 210, an attribute analyzer 212, and a context analyzer 214; and the data distribution analyzer 202 comprises a user preference portal 216, a storage location analyzer 218, and a data migration engine 220. The data backup snapshots 204 comprise images of the data stored within the cloud IT service solution 100 at a plurality of different times, including data stored on each of the databases 110 and 116 and tenant GUIs 112A-112C. Those images also may encompass data stored on the service provider systems 104A-104C. The predefined ontologies and taxonomies 206 comprise a set of data types, properties, and relationships that are defined by different sets of shared data characteristics. And the service provider compendium 208 comprises operational information (e.g., cost, availability, attribute, and configuration information) for each of the services and levels of services provided by the service provider systems 104A-104C.

Although the data backup snapshots 204, the predefined ontologies and taxonomies 206, and the a service provider compendium 208 generally are described as files that comprise certain types of information, it should be understood that those components 204-208 of the tenant system 102 also may be provided as modules that are configured to generate those files. And although the data classifier 200, the data distribution analyzer 202, the data backup snapshots 204, the predefined ontologies and taxonomies 206, and the service provider compendium 208 are depicted as separate components in FIG. 2, it should be understood that those components 200-208 also may be provided as any number of modules, including a single module. It also should be understood that one or more of the sub-components 210-214 and 216-220 of the data classifier 200 and the data distribution analyzer 202, respectively, may be provided as part of the same module, as separate modules, or any combination thereof.

The content extractor 210 is configured to extract information from data that may be utilized to classify and/or determine the context of that data. For example, the content extractor 210 may extract the text from the body of an electronic document, the content extractor 210 may extract tags associated with a digital image, and the content extractor 210 may extract actual content from digital images utilizing image recognition techniques. The content extractor 210 also may extract information that is associated with data, such as creation and edit dates, author and editor identities, and versioning information. That information may be utilized by the attribute analyzer 214 to determine the particular attributes of that data.

The context analyzer 212 is configured to determine the context in which data may have been or may be generated, modified, and/or accessed. Accordingly, the context analyzer 212 may utilize data association functionality to identify the different relationships that certain data has with different entities, systems, events, and/or other data based on whether that data is used in conjunction with or proximate to those different entities, systems, events, and/or other data. That data association functionality may utilize the data backup snapshots 204 to identify those relationships. It also may utilize other information to identify those relationships, such as calendar entries, search histories, and/or browsing histories.

For example, the context analyzer 212 may determine the context of an electronic document based on the author and recipients of an email to which that electronic document was attached, the content of the document and/or the email, and/or a related calendar entry. More specifically, the context analyzer 212 may associated the electronic document with each user identified as an author or recipient of the email. And the context analyzer 212 may associate the electronic document with a particular event identified in a calendar entry in a scheduling application utilized by any one of those users based on the content of the calendar entry and the content of the document and/or the email, both of which may be extracted by the content extractor 210. Accordingly, the context analyzer 212 also may utilize pattern-matching functionality to match the content of the calendar entry with the content of the document and/or the email.

By identifying the different relationships that certain data has with different users, events, and/or other data in that manner, the context analyzer 212 may identify the potential locations of duplicate data. Continuing with the foregoing example, the context analyzer 212 may identify the tenant GUIs 112A-112C utilized by each of the recipients of the email as potential locations of duplicate copies of the email and/or the document attached to that email. Or the context analyzer 212 may determine from a user's browser history that the user accessed a social media product (e.g., the FACEBOOK brand social media product, the TWITTER brand social media product, etc.) proximate to accessing an image file, based on which that social media product may be identified as a potential location of duplicate copies of the image file. Similarly, a social media product may identify other potential locations of duplicate copies of data. The content extractor 210 then may extract any tags that may be associated with that image file at that social media product, and the tenant GUIs 112A-112C utilized by any users that are tagged in that image file also may be identified as potential locations of duplicate copies of that image file.

In addition to identifying potential locations of duplicate copies of certain data, the context analyzer 212 also may identify users and/or events to which that data may be relevant and other data that may be related to that data. For example, the context analyzer 212 may identify users to whom certain data is relevant in the same manner that it identifies users that may be potential sources of duplicate data, such as by identifying an email as being relevant to a document attached to that email and identifying both the email and the attached document as being relevant to the author and the recipients of the email. And the context analyzer 212 may utilize its data association functionality to identify other data that is generated, modified, and/or accessed in conjunction with or proximate to certain data as being related to that certain data, particularly when the pattern-matching functionality of the context analyzer 212 also matches at least a portion of the content of that other data with the content of that certain data.

The attribute analyzer 214 is configured to determine the attributes of data utilizing the data backup snapshots 204, the predefined ontologies and taxonomies 206, the information extracted by the content extractor 210, and the context of the data determined by the context analyzer 212. For example, the attribute analyzer 214 may utilize the data backup snapshots 204 to determine whether certain data is seldom or never used and/or whether certain data has been replaced by a more recent version. The attribute analyzer 214 also may utilize natural language processing (NLP) to analyze the content of certain data and determine the types, properties, and relationships of that data based on the information extracted by the content extractor 210 and/or the predefined ontologies and taxonomies 206. Further, the attribute analyzer 214 may utilize pattern-matching functionality to identify duplicate data at the potential locations identified by the context analyzer 212 and data association functionality to determine that certain data has similar attributes to other data based on the relationships between those data identified by the context analyzer 212.

The attribute analyzer 214 classifies different data by associating that data with different attributes. Such attributes may include, for example, the confidentiality of the data, the relevance of the data, the uniqueness of the data, the purpose of the data, the value of the data, and the status of the data.

Accordingly, different combinations of those attributes may be utilized to assign different classifications to different data. For example, data identified as being highly confidential and having significant value may be classified as high security and high value. And data identified as being marginally relevant but highly unique may be classified as low relevance and high uniqueness.

The confidentiality of data may be determined from the information extracted by the content extractor 210 and/or the predefined ontologies and taxonomies 206. For example, the content extractor 210 may extract the heading "Privileged and Confidential" from the subject line of an email, from which the attribute analyzer 214 may determine that the subject email and any attachments to that is highly confidential. Or the predefined ontologies and taxonomies 206 may define a document with certain financial language (e.g., "current assets," "current liabilities," etc.) as belonging to a data type that may be confidential if not yet made public, and the content extractor 210 may extract that financial language from the document together with language that indicates that the fiscal quarter described in that document has not yet occurred, from both of which the attribute analyzer 214 may determine that the subject document also is highly confidential.

The relevance of data may be determined from the predefined ontologies and taxonomies 206, the information extracted by the content extractor 210, and the relationships identified by the context analyzer 212. For example, the attribute analyzer 214 may determine the relevancy of data to each other utilizing NLP and/or pattern-matching functionality to determine the degree of similarity between the content of the related data identified by the context analyzer 212, wherein a greater degree of similarity will reflect greater relevance. Or the attribute analyzer 214 may determine that different data generated by different users is relevant to each other if the content extractor 210 extracts the same or similar information from that different data. The attribute analyzer 214 also may determine that the subject information is relevant to each those different users and that the different data are relevant to each other based on that same or similar information. And if the subject information also falls within any of the predefined ontologies and taxonomies 206, the attribute analyzer 214 also may determine that any other data that falls within the same ontologies or taxonomies 206 also is relevant to each of those different users and/or each of those different data.

The uniqueness of data may be determined from the information extracted by the content extractor 210 and/or the data backup snapshots 204. For example, the attribute analyzer 214 may determine the uniqueness of data utilizing its pattern-matching functionality and the information extracted by the content extractor 210 to identify information that does not appear anywhere else on the tenant system 102 as unique. Or the attribute analyzer 214 may determine the uniqueness of data utilizing its pattern-matching functionality and the data backup snapshots 204 to measure the degree to which data has been edited over time, wherein a greater amount of editing between different data reflects a greater amount of uniqueness.

The purpose of data may be determined from the information extracted by the content extractor 210 and/or the predefined ontologies and taxonomies 206. For example, the content extractor 210 may extract language from the body of a document that is personal in nature (e.g., "resume," "son," "daughter," etc.) and, based on that language, the predefined ontologies and taxonomies 206 may define that document as having a non-business related, or personal, purpose. Or the content extractor 210 may extract language from the body of a document that is related to the business of the entity that utilizes the cloud IT service solution 100 (e.g., "earnings," "losses," "employee," etc.) and, based on that language, the predefined ontologies and taxonomies 206 may define that document as having a business related purpose.

The value of data may be determined from the information extracted by the content extractor 210, the data backup snapshots 204, and/or the predefined ontologies and taxonomies 206. That value may comprise the subjective, monetary value of the data and/or the objective, intangible value of the data to the entity that generated it. For example, the content extractor 210 may extract certain contract language (e.g., "this Agreement is entered into," "in consideration of the Agreement," etc.) from an electronic document, and the predefined ontologies and taxonomies 206 may define that document as a particular type of contract, from both of which the attribute analyzer 214 may determine that the subject document has a certain amount of intangible value to the entity that generated it. Similarly, the content extractor 210 may extract a file type and/or file description from a particular data (e.g., a purchased music file, a purchased software application, etc.), and the predefined ontologies and taxonomies 206 may define a particular monetary value for the corresponding data, from both of which the attribute analyzer 214 may determine that the subject data has a certain amount of monetary value. Or the attribute analyzer 214 may determine the value of data utilizing the data backup snapshots 204 to measure the amount that the subject data has been used, wherein a greater amount of use by different users reflects a greater amount of intangible value.

The status of data may be determined from the data backup snapshots 204, the information extracted by the content extractor 210, and/or the relationships identified by the context analyzer 212. For example, the attribute analyzer 214 may utilize the data backup snapshots 204 and versioning information extracted from data by the content extractor 210 to determine that certain data is obsolete because it has been replaced by a more recent version. Or similar to determining the intangible value of data, the attribute analyzer 214 also may utilize the data backup snapshots 204 to measure the amount that the subject data has been used, such that infrequent use will reflect not only a lesser amount of intangible value but also that the subject data may be deleted if it is not otherwise needed. The attribute analyzer 214 also may utilize the relationships identified by the context analyzer 212 to determine that certain data is replaceable when the context analyzer 212 determines that the data was downloaded from a third-party software provider system and the versioning information extracted from the data by the content extractor 210 identifies the data available on the third-party software provider system as being the same version as the data on the cloud IT service solution 100. The cost of replacing purchased data (e.g., music, videos, analyst reports, etc.) also may be utilized to determine if data is replaceable, as discussed below.

The user preference portal 216 is configured to provide a user-facing interface via which a tenant may access the functionality of the data distribution analyzer 202. As described above, the service provider systems 104A-104C provide heterogeneous sources of storage for the tenant system 102. And the user-facing interface of the user preference portal 216 is configured abstract those different sources of storage within a single storage fabric so that the STaaS provided by those service provider systems 104A-104C is presented to the tenant as a single service with the details of actual data placement obscured. Accordingly, a tenant may utilize the user preference portal 216 to select certain parameters for data storage (e.g., time period of required storage, amount of required storage, service level required, etc.) as part of a single service. The storage location analyzer 218 and data migration engine 220 then may analyze that information, in view of the service provider compendium 208, and autonomically migrate data between the different service provider systems 104A-104C in the background of that single service as required to continuously maintain the storage parameters selected by the tenant in the most cost effective manner.

The user-facing interface of the user preference portal 216 may be presented to a tenant via display at one of the tenant GUIs 112A-112C. And a tenant may select and/or input various storage parameters via any suitable input device (e.g., a keyboard, a mouse, etc.) at that tenant GUI 112A, 112B, or 112C. For example, when a tenant determines that it has run out or is about to run out of storage capacity at the tenant system 102, it may utilize the user preference portal 216 obtain additional storage capacity by selecting and/or inputting the amount of additional storage it is likely to need, the time period during which it is likely to need that storage, and the level of service it requires for that storage. A tenant also may utilize the user preference portal 216 to select and/or input other information that may be required to optimize the placement of data, such as the attributes and costs of any storage devices provided at the tenant system 102.

The storage location analyzer 218 is configured to determine whether to store data locally at the tenant system 102, whether to store data remotely at one of the service provider systems 104A-104C, or whether to dispose of data. The storage location analyzer 218 also is configured to determine whether to migrate data between the service provider systems 104A-104C as the classifications of data change, the requirements of the tenant change, and/or the service offerings of the service providers change. The storage location analyzer 218 may utilize service level management functionality to make those determinations based on the operational information compiled in/by the service provider compendium 208, the classifications assigned to that data by the attribute analyzer 214, and/or the information gathered via the user preference portal 216.

The storage location analyzer 218 may designate for deletion any data that is classified as duplicate, obsolete, unused, and/or replaceable. Although duplicate data generally may be designated for deletion without considering other classifications that may be assigned to that data, the storage location analyzer 218 may consider other classifications before designating obsolete, unused, and/or replaceable data for deletion. For example, older versions of the same electronic document may be classified as high value because the predefined ontologies and taxonomies 206 identify those types of electronic documents as archival and important for the purpose of record keeping. Unused data may be classified as high value for similar reasons. Unused data also may be classified as highly unique, such as when it is personalized for a particular user. Thus, rather than designating such archival data for deletion from the cloud IT service solution 100, the storage location analyzer 218 may designate that data for storage in an archival database either at the tenant system 102 or one of the service provider systems 104A-104C. And rather than designating such personalized data for deletion, the storage location analyzer 218 may designate that data for local storage at the tenant GUI 112A, 112B, or 112C that corresponds to the user by whom or for whom the data was personalized.

The storage location analyzer 218 also may designate replaceable data for storage at the tenant system 102 or one of the service provider systems 104A-104C if the cost of replacing that data is greater than the cost of storing that data. For example, if a file was downloaded from a third-party software provider system outside of the cloud IT service solution 100, but the third-party software provider system charges a fee to download another instance of that file, the storage location analyzer 218 may compare that cost to the cost of storing that file at the tenant system 102 or one of the service provider systems 104A-104C. The cost of storing that file at the tenant system may be determined, for example, based on the amortized cost of existing storage devices and/or storage devices that may need to be purchased, and the cost of storing that file at the service provider systems 104A-104C may be determined from the cost of purchasing storage at each of the service provider systems 104A-104C. The former cost may be obtained from the information gathered via the user preference portal 216, and the latter cost may be obtained from the operational information compiled in/by service provider compendium 208 and the selections made by the tenant via the user preference portal 216. And if the cost associated with downloading another instance of the file is greater than the cost associated with storing that file for a predetermined period of time, the storage location analyzer 218 may designate that file for storage at the least costly of the tenant system 102 and the service provider systems 104A-104C. Otherwise, if the cost associated with downloading another instance of the file is less than the cost associated with storing that file for a predetermined period of time, the file may be designated for deletion and re-downloaded to the cloud IT service solution 100 if it is subsequently needed again.

Storage costs also may be considered with respect to data classified as obsolete and/or unused. For example, data classified as obsolete and/or unused may be designated for deletion any time the cost of storing that data outweighs the other factors. By way of more example, data classified as obsolete and/or unused also may be classified as medium value. Accordingly, the storage location analyzer 218 may designate that data for deletion when it determines that the cost of storing that data has reached a predetermined amount that outweighs the value of that data. Because both the cost of storage may change and the value of certain data may change over time, so too may the results of that determination. A similar determination also may be made for other classifications of data.

Just as the storage location analyzer 218 may designate a file for storage at the least costly of the tenant system 102 and the service provider systems 104A-104C when the cost of storing that file is less than the cost of replacing that file, so too may the storage location analyzer 218 designate other classifications of data for storage at the least costly of the tenant system 102 and the service provider systems 104A-104C. For example, the classification assigned to a first set of data by the attribute analyzer 212 may indicate that the first set of data requires a high level of control and/or security. The attribute analyzer 212 also may assign a classification to a second set of data that indicates that the second data set is of low value and/or is used less frequently than other data sets. Accordingly, the storage location analyzer 218 may compare the cost of storing the first data set and the second data set at the tenant system 102 with the cost of storing that same data at a service provider system 104A, 104B, or 104C that provides a sufficient level of security. Thus, the storage location analyzer 218 also may determine whether a particular service provider system 104A, 104B, or 104C provides a particular level of service, such as a particular level of security. That level of service may be based on the classification assigned to the subject data and/or the selections made by the tenant via the user preference portal 216.

Continuing with the foregoing example, the storage location analyzer 218 may determine that the first service provider system 104A provides an adequate level of security but that it is less costly to store the first data set at the tenant system 102 because the cost of the level of service that provides that level of security is greater than the amortized cost of the storage devices required to store that data at the tenant system 102. All other things being equal, data that is of low value and/or that is used less frequently generally requires less security, and less security generally corresponds to a level of service that costs less than other levels of service. Thus, the storage location analyzer 218 also may determine that it is optimal to store the second set of data at the second service provider system 104B. Accordingly, the storage location analyzer 218 may optimize the placement of data to minimize costs by designating the first data set for storage at the tenant system 102 and designating the second data set for migration from the tenant system 102 to the second service provider system 104B.

Although the foregoing example is described primarily in terms of the costs of the services provided at each of the service provider systems 104A-104C, the cost of moving the data also may be considered in determining whether and where to move that data. And although the foregoing example also is described primarily in terms of the level of security of the services provided at each of the service provider systems 104A-104C, the security of the channel via which the data may be moved to each of those service provider systems 104A-104C also may be considered in determining whether and where to move that data. Accordingly, the storage location analyzer 218 may optimize the placement of data to minimize both overall costs and overall security risks, not just the costs and security risks associated with storage.

Cost and security, however, are not the only factors considered by the storage location analyzer 218 when determining whether and where data should be stored. For example, control and access to data identified as being highly confidential and having significant value may override the cost factor in certain circumstances. Accordingly, the storage location analyzer 218 may determine that it is optimal to store such data at the tenant system 102, rather than at one of the service provider systems 104A-104C, to ensure that the subject data may be accessed even if the network connection 106 with the service provider systems 104A-104C fails. Thus, the storage location analyzer 218 also may balance the business value of the data with the costs and security risks associated with storing that data.

Further, data that may otherwise have little business value may still be designated for storage due to its relevance to other data. For example, even if the information extracted from data by the content extractor 210 results in that data being classified as low value and low uniqueness, the context analyzer 212 may determine that the subject data frequently is utilized in conjunction with or proximate to other data that is classified as high value and high relevance. Accordingly, the attribute analyzer 214 may determine that subject data has medium relevance due to its strong relationship with the other data that is classified as high relevance, which may result in the data being designated for storage by the storage location analyzer 218, rather than being designated for deletion. By considering a plurality of classifications in that manner, some of which do not depend on the content of the data, the storage location analyzer 218 may more effectively and efficiently determine whether and how data should be stored, even when the content of that data does not lend itself to such a determination.

In addition, the storage location analyzer 218 may optimize the placement of data in a dynamic manner by continuously monitoring the service provider compendium 208 to determine if and when the costs associated with storing that data change as a result of changes in the storage requirements of the tenant and/or the service offerings at the service provider systems 104A-104C. Such optimization also may be performed to ensure that the level of service associated with a particular cost is utilized as fully as possible. For example, the storage location analyzer 218 may designate data for migration from one service provider system 104A, 104B, or 104C to another as required to respond to and/or take advantage of certain service offerings. The storage location analyzer 218 also may designate data for migration from one service provider system 104A, 104B, or 104C to another to maximize the amount of the purchased service that is utilized at that service provider system 104A, 104B, or 104C.

By way of more specific example, a cloud IT service provider may offer a reduced rate for the first twelve (12) months of service as an incentive to purchase that particular service, in which case the storage location analyzer 218 may automatically designate all of that data for migration from the corresponding service provider system 104A to another service provider system 104B at the end of that twelve-month period to prevent the specified cost increase. Similarly, a cloud IT service provider may provide storage at the third service provider system 104C in a tiered cost structure such that different costs are associated with different ranges of service (e.g., $50/month for up to 100 GB, $125/month for up to 200 GB, etc.), in which case the storage location analyzer 218 may designate data for migration to or from the third service provider system 104C as required to achieve a volume of data that prevents the storage cost from jumping to the next level. Data may be designated for migration between the service provider systems 104A-104C in that manner not only as required to prevent the storage costs from jumping to the next level, but also as required to ensure that the storage being utilized at those the service provider systems 104A-104C is being utilized as close as possible to the threshold level so as to maximize the utilization of the service being purchased.

To facilitate the dynamic migration of data between service provider systems 104A-104C, the service provider compendium 208 may be continuously updated by actively discovering and gathering operational information (e.g., cost, availability, attribute, and configuration information) for each of the services and levels of services provided by the service provider systems 104A-104C. That information may be discovered and gathered on a tenant-by-tenant basis to ensure that any one-time offers, trial offers, and/or other tenant-specific opportunities are captured for a particular tenant. For example, tenants that have not utilized the STaaS of a certain service provider before may be offered a certain amount of free storage (e.g., the first 25 GB) as part of a one-time offer to induce those tenants to purchase storage from that service provider for the first time. A service provider also may offer a free trial for similar reasons. Accordingly, the service compendium 208 may reflect the specific opportunities that are available to certain tenants on a tenant-by-tenant basis so that the eligible tenants may capitalize on those opportunities.

The operational information compiled in/by the service provider compendium 208 may be discovered and gathered, for example, utilizing web crawling or spidering software. It also may be gathered by establishing a client-server relationship between the tenant system 102 and one or more of the service provider systems 104A-104C and utilizing push and/or pull techniques to transmit that information to the storage location analyzer 218. That functionality may be provided in the service provider compendium 208 itself, such that the service provider compendium 208 operates as its own software module. That compiling functionality also may be provided in some other software module and utilized to populate the service provider compendium 208, such that the service provider compendium 208 operates only as a reference file or group of reference files. In addition, or in the alternative, the operational information may be compiled by third parties and/or manually input into the service provider compendium 208.

The storage location analyzer 218 is configured to filter and order each of the services and levels of services provided by the service provider systems 104A-104C based on the classifications assigned to the subject data by the data classifier 200; the operational information compiled in/by the service provider compendium 208; and the parameters for data storage gathered by the user preference portal 216. For example, the storage location analyzer 218 may filter the services and levels of services provided by the service provider systems 104A-104C to identify only those that meet a minimum threshold, such as providing the service level required for the subject data. The remaining services and levels of service then may be ordered based on their respective cost, size, and availability for the time period selected by the tenant. The service level required for the underlying data may be determined from the classifications assigned to that data (e.g., confidentiality, value, etc.) and/or level of service selected by the tenant (e.g., security, availability, location, performance, etc.).

By way of more specific example, a tenant may indicate via the user preference portal 216 that it will require 75 GB of storage for at least four (4) months with a specific type of virus protection. Accordingly, the storage location analyzer 218 may filter all of the available services and levels of services into a list that includes only the services and levels of services that satisfy those parameters. The storage location analyzer 218 then may order the filtered services and levels of services based on their respective cost, size, and availability for the next four (4) months. Based on that ordering, the storage location analyzer 218 may eliminate additional services and levels of services from its analysis, such as by removing from the pool those services and levels of services that are least likely to satisfy the tenants requirements (e.g., those with the highest cost per unit of storage during the selected time period).

To determine which of the filtered services and levels of services provides the least costly storage solution for the tenant, the storage location analyzer 218 may calculate both the cost of the required storage based on predetermined threshold data storage rates (e.g., Threshold=$50/month for up to 100 GB; 75 GB≤100 GB; Storage Cost=$50/month*4 months=$200) and the cost of migrating the subject data to the target location based on tiered data transfer rates (e.g., Transfer Rate=$0.15/GB for first 10 GB, $0.10/GB for next 50 GB, and $0.05/GB for next 100 GB; Transfer Cost=(10 GB×$0.15/GB)+(50 GB×$0.10/GB)+(15 GB×$0.05/GB)= $7.25) to obtain the total cost associated with storing the subject data at the target location (Total Cost=$200+ $7.25=$207.25). The storage location analyzer 218 may perform that calculation for each storage location that corresponds to a service or level of service that remains after the filtering and ordering operations. And the storage location analyzer 218 then may designate the subject data for migration to the least costly of those locations (e.g., Location A). If the data already is stored at that location, its location designation will not change.

In addition to considering the cost of migrating data to a particular storage location, the storage location analyzer 218 also may consider the amount of storage that remains at a particular storage location before designating the subject data for migration to that location. For example, if the storage location analyzer 218 determines that the tenant's requirements for data storage are increasing at a rate of 15 GB per month and the tenant has indicated that it currently requires 75 GB of storage for at least four (4) months, the storage location analyzer 218 may designate the subject data for storage at a more costly location if that location has a higher storage threshold before the costs per GB of storage increase. In that example, a first location charges $55 per month for up to 150 GB of storage while a second location may charge $50 per month for up to 100 GB of storage and $75 per month for up to 200 GB of storage. Accordingly, the storage location analyzer 218 may designate the subject data for storage at the first location, despite the second location having a lower initial cost, if the cost of storing the subject data at both the first and second location and migrating the subject data three (3) times (i.e., (1) to the second location, (2) from the second location, and (3) to the first location) exceeds the cost savings provided by storing the subject data at the first location for the entire four (4) months.

In more detail, the storage location analyzer 218 may determine the cost of storing the subject data at the location provided by the first service provider for all four (4) months (e.g., Cost of Storage Location A=$55 for 75 GB in first month+$55 for 90 GB in second month+$55 for 105 GB in third month+$55 for 120 GB in fourth=$220; Cost of Migration to Location A=$9.75 for 120 GB) and the cost of storing the subject data at the location provided by the second service provider for all four (4) months (e.g., Cost of Storage Location B=$50 for 75 GB in first month+$50 for 90 GB in second month+$75 for 105 GB in third month+$75 for 120 GB in fourth=$250; Cost of Migration to Location B=$12.25 for 120 GB). The storage location analyzer 218 also may determine the cost of storing the subject data at the location provided by the first service provider for the last two (2) months (e.g., Cost of Storage Location A=$55 for 105 GB in third month+$55 for 120 GB in fourth=$110; Cost of Migration to Location A=$9.75 for 120 GB) and the cost of storing the subject data at the location provided by the second service provider for the first two (2) months (e.g., Cost of Storage Location B=$50 for 75 GB in first month+ $50 for 90 GB in second month=$100; Cost of Migration to Location B=$8.50 for 90 GB; Cost of Migration from Location B=$8.50 for 90 GB). The storage location analyzer 218 then may determine whether it is less costly to store the subject data at the first or second location for all four (4) months (e.g., Location A=$220+$9.75=$229.75; Location B=$250+$12.25=; $262.25; $229.75<$262.25→Less Costly at Location A), the cost of storing the subject data at the second location for the first two (2) months and the first location for the second two (2) months (e.g., $100+$8.50+ $8.50+$110+$9.75=$237.75), and whether it would be less costly to store the subject data at one of the first and second locations for all four (4) months rather than migrating the subject data from the second location to the first location after the first two (2) months (e.g., $229.75<$237.75→Location A for All Four (4) Months=Least Costly). As a result, the storage location analyzer 218 may designate the subject data for storage at the least costly location (e.g., Location A).

In the foregoing example, the storage location analyzer 218 determined that the tenant's requirements for data storage were increasing at a rate of 15 GB per month. That rate may be obtained from input provided by a tenant via the user preference portal 216, it may be determined by the data distribution analyzer 202 utilizing logging functionality to track the average amount of additional data being generated by that tenant as that data is generated, or it may be obtained from another source, such as a look-up table populated by averaging the rates at which similar tenants have generated additional data in the past. As the foregoing example demonstrates, the storage location analyzer 218 may utilize that rate in combination with the different storage thresholds for different locations to more effectively and efficiently determine the least costly location at which to store data predetermined period of time as its volume continues to grow.

As another example, if the cost of storing data at a plurality of storage locations is less than the cost of storing that data at a single location, the storage location analyzer 218 may progressively designate data for storage at different locations as that data is generated. For example, if a first location charges $50 per month for up to 100 GB of storage and $115 per month for up to 250 GB, a second location charges $55 per month for up to 150 GB of storage and $125 per month for up to 300 GB, the migration costs for the two (2) locations is comparable, and a tenant's storage needs are likely to grow from 75 GB to 200 GB, the storage location analyzer 218 may designate the first 100 GB for storage at the first location and the second 100 GB for storage at the second location because it determines that it is less costly to store the data at both locations than to allow the data to reach the next threshold (e.g., $50/month for 100 GB+$55/month for 150 GB=; $110/month for 250 GB; $115/month for 250 GB>$110/month for 250 GB; $125/month for 300 GB>$110/month for 250 GB). Accordingly, the storage location analyzer 218 may designate data for storage progressively at different locations as certain cost thresholds are reached, designate data for migration from one location to another as storage requirements and/or service offerings change, or a combination thereof to ensure that the costs of data storage are minimized.

If the rate of data generation is unknown or unavailable, or as an alternative to the foregoing examples, the storage location analyzer 218 also may designate data for storage at different locations progressively from the least costly to the most costly. For example, the storage location analyzer 218 may order the results of its cost calculations in from least costly to most costly for predetermined thresholds of data (e.g., (1) Location A=$198.50 for 100 GB and $226.25 for 200 GB, (2) Location B=$207.25 for 100 GB and 243.75 for 300 GB, and (3) Location C=$212.75 for 100 GB and $235.25 for 250 GB) and either progressively designate data for storage in those locations from least costly to most costly as those thresholds are reached (e.g., First 100 GB to Location A→Second 100 GB to Location B→Second 100 GB to Location C), designated that data for migration between those locations as those thresholds are reached (e.g., Store First 100 GB at Location A→Migrate from Location A to Location C After 100 GB→Migrate from Location C to Location B after 250 GB), or some combination thereof.

In each of the foregoing examples, the storage location analyzer 218 may dynamically react to changes in data classifications, a tenant's storage requirements, and/or the service offerings of service providers as they occur. Changes in data classifications may be a change of classification from low security and/or value to high security and/or value, a change of classification from high security and/or value to low security and/or value, and a change of classification to duplicate, obsolete, unused, and/or replaceable. Changes to a tenant's storage requirements may be an increase in required storage capacity, a decrease in required storage capacity, or a change in the tenants desired level of service. Changes to the service offerings of a service provider may be an increase in data storage rates and/or data transfer rates, a decrease in data storage rates and/or data transfer rates, a one-time offer, a trial offer, or other opportunities. And as described above, those changes to the service offerings may be gathered in/by the service provider compendium 208 on a tenant-by-tenant basis because some of those opportunities may be tenant specific.

By way of example, a first service provider may change its data storage rates and/or data transfer rates while data is being stored at the service provider system 104B of a second service provider. Similarly, that second service may change its data storage rates and/or data transfer rate while it is storing the subject data. If the storage location analyzer 218 determines that one or both of those changes results in it being less costly to store the subject data at the service provider system 104A of the first service provider, the storage location analyzer 218 may designate that data for migration to that location upon making that determination. The storage location analyzer 218 may take advantage of one-time offers and free trials in a similar manner.

In addition, the storage location analyzer 218 may utilize predictive modeling to determine when certain service providers may change their data storage rates and/or data transfer rates in the future based on historical changes. For example, the storage location analyzer 218 may determine that a third service provider is likely to lower its storage rates at the end of the year because that service provider has historically implemented year-end sales. Or the storage location analyzer 218 may determine that a new service provider is likely to offer lower data storage rates and/or data transfer rates to entice tenants to try their newly offered services. By predicting such rate changes, the storage location analyzer 218 may calculate and plan for such future rate changes before they actually occur so that it may more accurately and efficiently determine where to place data in a manner that minimizes costs.

Because the storage location analyzer 218 also designates data for storage in different locations based on the different classifications assigned to that data, it should be understood that data migration may require certain data to be stored in different locations. For example, of 100 GB of data, 25 GB may be classified as high security and/or high value while the other 75 GB may be classified as requiring lesser security and/or having lower value. Accordingly, the storage location analyzer 218 may filter the various services and levels of service based on different characteristics for those two (2) sets of data, which would include filtering out services and service levels with insufficient security for the 25 GB of data that may not be filtered out for the 75 GB of data. The storage location analyzer 218 then may determine which of the corresponding locations is least costly for storing each of those two (2) sets of data and designate each set of data for storage at the least costly location. In the alternative, the other 75 GB of data may be stored in the same location as the 25 GB of data, even if that location provides more security (and therefore costs more) than is needed for the other 75 GB of data, if there is sufficient space remaining at that location to store the other 75 GB of data without exceeding the current threshold amount of storage being purchased. Accordingly, the storage location analyzer 218 may account for both the classification of data and the cost of storing that data when determining where to store that data.

The data migration engine 220 is configured to delete data and to migrate the remaining data between the tenant system 102 and the service provider systems 104A-104C based on the designations assigned to that data by the storage location analyzer 218. For example, when the storage location analyzer 218 designates duplicate, obsolete, unused, and/or replaceable data for deletion, the data migration engine 220 may utilize de-duping functionality to delete that data. By way of more specific example, when duplicates of the same data reside of the cloud IT service solution 100, the data migration engine 220 may utilize its de-duping functionality to delete the instances of that data that reside in non-centralized locations and replace them with references that point to a single, remaining instance of the data in a centralize location. By deleting duplicate instances of data in that manner, the data migration engine 220 may reduce the total amount of storage required in the cloud IT service solution 100 and slow the growth rate of new data, thereby reducing both the immediate and long-term costs of storage.

When the storage location analyzer 218 designates data for migration from one location to another, the data migration engine 220 automatically migrates that data from its current location to the other. That migration may occur immediately, as the designation is assigned, or it may be performed in batch mode, after a predetermined amount of data has been assigned new designations. For example, the data migration engine 220 may migrate data progressively from the first service provider system 104A to the second service provider system 104B and/or third service provider system 104C as each datum is assigned a new location designation, or the data migration engine 220 may wait until an entire set of data has been assigned new designations and migrate that set of data from the first service provider system 104A to the second service provider system 104B and/or third service provider system 104C after all of the data has been assigned its new designations. Further, the storage location analyzer 218 may generate a tool for migrated data that automatically loads, uploads, downloads, and/or accesses the data from its current location without the tenant needing to know the actual location of that data.

Because the STaaS provided by each of the service provider systems 104A-104C is presented to tenants as a single service, the resulting deletion and migration of data may be performed in the background of the cloud IT service solution 100. In other words, the different services and levels of services provided at the service provider systems 104A-104C may be abstracted within a storage fabric as a single storage solution so that a tenant need only select certain storage parameters (e.g., cost, size, time period, security, availability, location, performance attributes, etc.) via the user preference portal 216 and different services and levels of service levels will be autonomously provided in accordance with those selected parameters. Accordingly, data may be continuously migrated in the background of the cloud IT service solution 100 as the classifications of data change, the requirements of the tenant change, and/or the service offerings of the service providers change, such that the tenant may enjoy the benefits of that migration without any visible effect on the operation of the of the cloud IT service solution 100.

Figure 3:
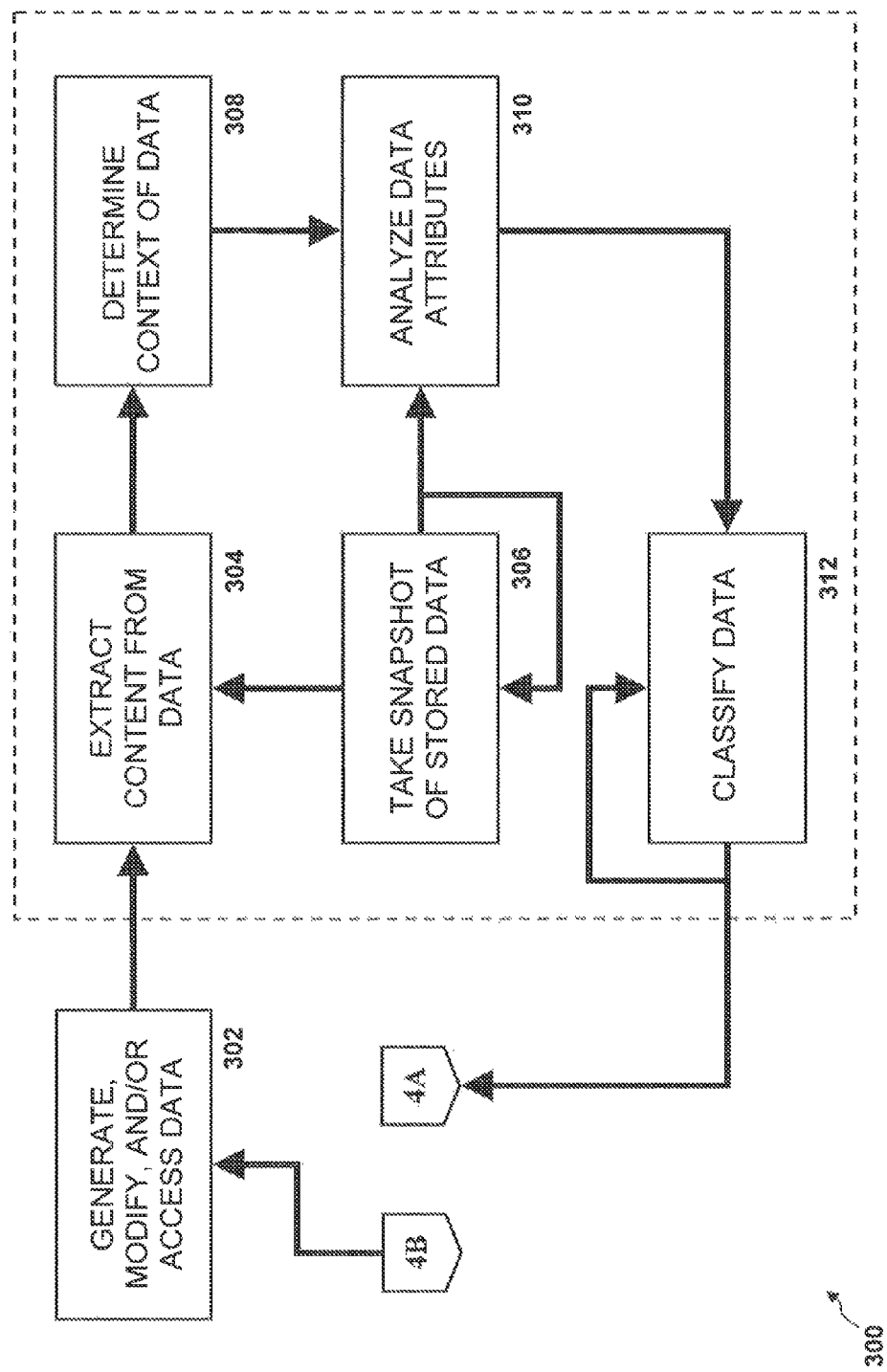
FIG. 3 is a flow diagram illustrating an example of a process for optimizing the placement of data according to a non-limiting embodiment of the present disclosure.
Figure 4:
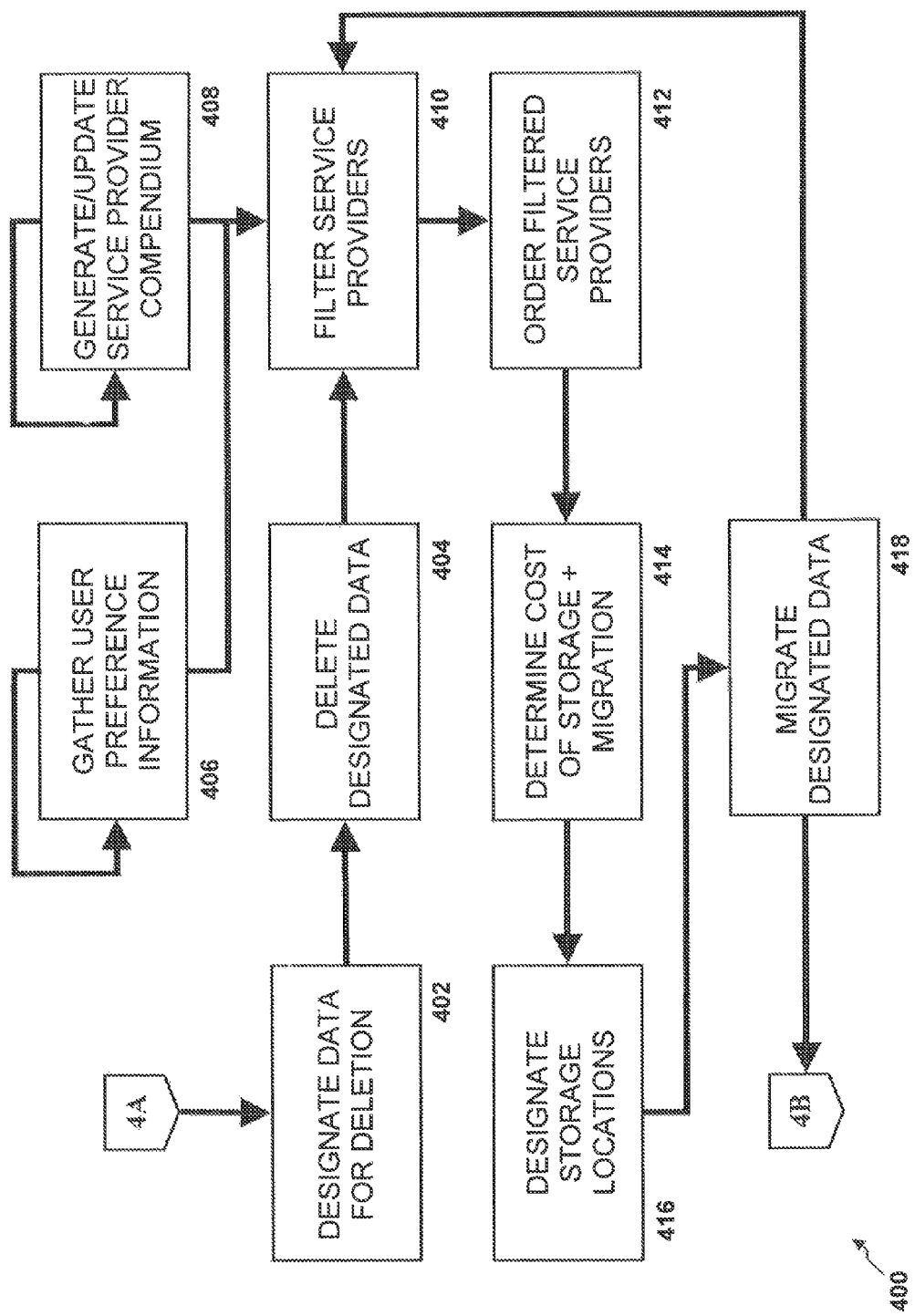
FIG. 4 is a flow diagram illustrating an example of a process for dynamically determining the placement of data according to a non-limiting embodiment of the present disclosure.

Turning to FIG. 3, a process for optimizing the placement of data 300 is depicted according to a non-limiting embodiment of the present disclosure. That process includes a two (2) sub-processes—1) data classification (e.g., Steps 304-312), as depicted by the dashed-line box depicted in FIG. 2, and 2) data distribution analysis (e.g., Steps 402-418), as depicted by the off-page connectors labeled "4A" and "4B" in FIG. 3. The data distribution analysis process 400 is depicted in FIG. 4 and may begin after steps 306 and 312 of the process for optimizing the placement of data 300. And because the process for optimizing the placement of data 300 may be performed in a continuous loop, the data distribution analysis process 400 also may be performed before the process for optimizing the placement of data 300 begins again at step 302.

At step 302, a user at the tenant system 102 may generate, modify, and/or access data utilizing one of the tenant GUIs 112A-112C. For example, a user may generate data by composing an email, creating a calendar entry with a scheduling application, drafting an electronic document with a word processing application, downloading a file to the cloud IT service solution 100 from a third-party software provider system, or posting content to a social media product; a user may modify data by deleting a received email, editing a calendar entry, editing an electronic document, updating software, or updating content on a social media product; and a user may access data by opening an email, opening a calendar entry, opening an electronic document, opening a software program, or viewing content on social media product. Each of those events may result in a change in the content, context, or history of certain data. For example, accessing content outside of the cloud IT service solution 100 being stored, or cached, on one of the tenant GUIs 112A-112C. And even if data that is accessed already resides within the cloud IT service solution 100, such access may change the context and history of that data by identifying to whom the data may be relevant and the number of times that data has been viewed—the former of which may be utilized by the attribute analyzer 214 to determine the relevance of that or other data, and the latter of which may be utilized by the attribute analyzer 214 to determine the value of that data or other data.

At step 304, the content extractor 210 extracts content from the data that was generated, modified, and/or accessed at step 302. For example, the content extractor 210 may extract the subject line, author name, recipient name(s), time and date sent, and body text from an email; the content extractor 210 may extract the host name, invitee name(s), subject line, time and date, and body text from a calendar entry; the content extractor 210 may extract the author name, version number, creation and/or modification date, and body text from an electronic document; and the content extractor 210 may extract the identities of people tagged in a digital image, the text of a post, whether a user indicated interest or disinterest in certain content, and the identities of other people that may have commented or otherwise indicated interest or disinterest in the same content on a social media product. If the data extractor 304 already has extracted content from the subject data and that data has not changed since that content was extracted, the data extractor 304 may only extract the information required to determine that content already has been extracted from the subject data, such as versioning information and/or the time and date the data was created or edited. Thus, if a user accesses existing data at step 302 without modifying that data, at least some previously extracted content may be utilized to assign attributes to that data at step 308 so that the same content does not need to be extracted again at step 304.

It may be determined at step 304 that content already has been extracted from certain data by comparing that data to the data backup snapshots 204. Those data backup snapshots 204 may be generated continuously at step 306 in a cyclical manner, as depicted by the arrow extending from and returning to step 306 in FIG. 3. Thus, the most recently generated data backup snapshot 204 may be compared to any existing data that is accessed at step 302 to determine whether the data accessed at step 302 differs from a previously analyzed instance of that data. If the data accessed at step 302 does not differ from a previously analyzed instance of that data, the data extractor 304 need not extract any more content from that data than the content that is required to make that determination. The content extractor 304 also may extract all the pertinent content from that data at step 304, regardless of whether content already has been extracted from that data, so as to ensure that the subject data has not been modified from a previous instance and to enable the identification of any such modification.

At step 308, the context analyzer 212 determines the context in which the subject data may have been generated, modified, and/or accessed. For example, the context analyzer 212 may associate an electronic document with each user identified as an author or recipient of an email to which that electronic document was attached. Or the context analyzer 212 may associate an electronic document with a particular event identified in a calendar entry in a scheduling application based on the content of the calendar entry and the content of the document. By identifying the different relationships that certain data has with different users, events, and/or other data in that manner, the context analyzer 212 may identify the potential locations of duplicate data. The context analyzer 212 also may identify users, events, and/or other data that is relevant to the subject data.

At step 310, the attribute analyzer 214 determines the attributes of data utilizing the content extracted by the content extractor 210 at step 302, the data backup snapshots 204 generated at step 306, the context of the data determined by the context analyzer 212 at step 308, and/or the predefined ontologies and taxonomies 206. For example, the attribute analyzer 214 may determine that an electronic document is an earnings report by utilizing NLP to identify certain financial language (e.g., "current assets," "current liabilities," etc.) among the content extracted by the content extractor 210 at step 302 and by utilizing the predefined ontologies and taxonomies 206 to determine that the subject financial language corresponds to an earnings report. The attribute analyzer 214 also may utilize the relationships between data determined by the context analyzer 212 at step 308 to identify other data that is related to that electronic document. For example, the context analyzer 212 may utilize pattern-matching functionality at step 308 to identify a calendar entry that provides the scheduled release date of earnings report based on similar language in those two data. And the context analyzer 212 may utilize data association functionality to identify any related documents to the earnings report, such as any spreadsheets utilized to generate the numbers provided in the earnings report, based on those related documents being generated, modified, and/or accessed concurrently with or proximate to the earnings report. Accordingly, the attribute analyzer 214 may identify each of those data as being relevant to each other and/or to a particular users or event, the relevance of which may be determined as a matter of degree based on factors such as commonality of content and/or frequency of concurrent or proximate use.

At step 312, the attribute analyzer 214 classifies different data by associating that data with the different attributes identified at step 310. Some of the attributes identified at step 310 may change over time. For example, if an electronic document is identified at step 310 as an earnings report with a release date that has not yet arrived, the attribute analyzer 214 may determine that the earnings report is highly confidential. After that release date has passed and the earnings report has been made public, the attribute analyzer 214 may change that attribute from highly confidential to public. Accordingly, step 312 may be performed in a cyclical manner, as depicted by the arrow extending from and returning to step 312 in FIG. 3, such that the attribute analyzer 214 may identify any time-based change in an attribute as it occurs.

As described above, different combinations of attributes may be utilized by the attribute analyzer 214 to assign different classifications to different data at step 312. For example, in addition to being classified as high security due to its highly confidential nature, an earnings report also may be classified as high value due to its importance to the quarterly operations of the business that utilizes the cloud IT service solution 100. The resulting classifications assigned to the subject data at step 312 therefore would be high security and high value.

As additional example of a classification that may be assigned to data at step 312, a classification of low relevance may be assigned to data that is not of particular relevance because it does not comprise any of the shared data characteristics that define the data types, properties, and relationships of the predefined ontologies and taxonomies 206. That data also may be of low relevance because the content extracted from that data at step 304 does not match the content of any other data and/or because no other data was generated, modified, and/or accessed concurrently with or proximate to the generation, modification, and/or access of that data. Nevertheless, those latter attributes also may result in a classification of high uniqueness. Accordingly, the subject data may be classified as low relevance and high uniqueness.

Although each of the foregoing examples is described in terms of two (2) classifications being assigned to certain data at step 312, it should be understood that more or fewer classifications also may be assigned to data at step 312. Nevertheless, the more classifications that are assigned to data at step 312, the more effectively and efficiently the data distribution analyzer 202 may determine the optimal placement of that data at steps 402-418. For example, an electronic document that is personal in nature may be classified as low relevance and high uniqueness because it is not related to the business operations of the entity that utilizes the cloud IT service solution 100, while an electronic document that is created for a new project for the entity that utilizes the cloud IT service solution 100 also may be classified as low relevance and high uniqueness because that project is new and otherwise unrelated to previous projects. The former data may further be classified as personal based on the attributes identified by the attribute analyzer 214 at step 310, such as language in the body of the document that is personal in nature (e.g., "resume," "son," "daughter," etc.); and the latter data may further be classified as business, high security, and/or high value based on the attributes identified by the attribute analyzer 214 at step 310, such as language in the body of the document that is business related and forward looking (e.g., "press release," "announce," "break ground," etc.).

Based on that information, the attribute analyzer 214 may classify the former data as low relevance, high uniqueness, and personal at step 312; and the attribute analyzer 214 may classify the latter data as low relevance, high uniqueness, and business at step 312. The latter data also may be classified as low relevance, high uniqueness, business, high value, and high security at step 312 if it is determined at step 308 that the date for making the new project public has not yet occurred. As a result, the storage location analyzer 218 may designate the former data for deletion or for storage at one of the tenant GUIs 112A-112C, and the storage location analyzer 218 may designate the latter data for storage at the tenant system 102 or one of the service provider system 104A, 104B, or 104C that provides a higher level of security.

Turning to FIG. 4, the process for optimizing the placement of data 300 continues at step 402 of the data distribution analysis process 400. At step 402, the storage location analyzer 218 identifies deletable data based on the status of that data determined by the context analyzer 212 and the attribute analyzer 214. For example, the context analyzer 212 may identify each of the recipients of an email as potential sources of duplicate copies of the email and any document attached to that email. The context analyzer 212 also may identify other sources of the document attached to the email and/or related data, such as by determining from the author's browser history or other means that the author frequently utilizes some form of social media product and that the author has tagged one or more of the recipients of the email in a digital image on the social media product, based on which the context analyzer 212 may identify any other people tagged in the digital image as possible sources of the document and/or related data. The attribute analyzer 214 then may utilize that information to identify duplicate data, such as at the GUIs 112A-112C that are associated with any users that received the subject email or that were tagged in that digital image. The data migration engine 220 then may utilize its de-duping functionality to delete any duplicate data at step 404.

Also at step 402, the storage location analyzer 218 may determine that certain data may be deleted because it was classified as obsolete, unused, and/or replaceable at step 312. For example, the context analyzer 212 may determine from the data backup snapshots 204 that certain data has been replaced with a newer version and/or has not been used in a predetermined amount of time. Further, the context analyzer 212 may determine from a user's browser history that the user downloaded certain data from a third-party software provider system. If that data still is available from that third-party software provider system and the versioning information extracted from that data at step 304 matches the versioning data of the data that is still available, the attribute analyzer 212 may identify that data as replaceable at step 312. Then, based on any other classifications assigned to that data at step 312, the storage location analyzer 218 may determine at step 402 whether or not to designate such deletable files for deletion at step 404.

The deletion of replaceable data at step 404 may not occur immediately. Instead, it may occur only as storage space as required utilizing a lazy deletion technique. Data also may be deleted at step 404 only when a certain cost threshold for storing it has been reached, or it may be deleted immediately using full erase procedures to ensure that the data is not recoverable, such as when the data is also classified as high security. Further, and as discussed above, there also may be instances in which the data migration engine 220 does not delete obsolete, unused, and/or replaceable data at step 404. For example, obsolete data may be classified as having high value due to its archival importance. Or unused data may be classified as having high uniqueness to a particular user. Accordingly, the data migration engine 220 may not delete that data at step 404. Instead, it may determine where to store that data at step 416. Nevertheless, deleting obsolete, unused, and/or replaceable data at step 404 reduces the amount of data that the storage location analyzer 218 must analyze in the steps preceding step 416 (e.g., Steps 410-414).

At step 406, user preference information is gathered via the user preference portal 216. For example, a tenant may utilize the user preference portal 216 to select certain parameters for the data storage that it requires (e.g., time period of required storage, amount of required storage, service level required, etc.). In the alternative, user preference information may be generated automatically utilizing learning algorithms to learn from a tenant's behaviors and determine the level of service required by that tenant based on those behaviors. The storage location analyzer 218 and data migration engine 220 then may analyze that user preference information, in view of the service provider compendium 208, to autonomically place data on and/or migrate data between the different service provider systems 104A-104C as required to satisfy those parameters. A user may update or modify those parameters at any point in the process for optimizing the placement of data 300 and/or the data distribution analysis process 400, as depicted from the arrow extending from and returning to step 406 in FIG. 4. Moreover, the storage location analyzer 218 and data migration engine 220 may dynamically respond to such updates and/or modifications in real time, as they occur.

At step 408, the service provider compendium 208 is generated and/or updated to include operational information for each of the services and levels of services provided at each of the service provider systems 104A-104C. The service provider compendium 208 may be continuously updated and/or augmented at step 408 in a cyclical manner as cloud IT service providers update their service offerings and/or rates, as depicted by the arrow extending from and returning to step 408 in FIG. 4. And as discussed above, those service offerings and/or rates may be compiled in/by the service provider compendium 208 on a tenant-by-tenant basis, which allows tenants to take advantage of one-off deals that may be input into the service provider compendium 208 manually by the service providers offering those deals. Accordingly, like the user preference information gathered via the user preference portal 216 at step 406, the storage location analyzer 218 and data migration engine 220 may dynamically respond to updates to the service provide compendium 208 in real time, as they occur.

At step 410, the storage location analyzer 218 utilizes the classifications assigned to the subject data by the data classifier 200 at step 312 and the parameters for data storage gathered by the user preference portal 216 at step 406 to filter the services and levels of services compiled in/by the service provider compendium 208 at step 408. For example, the storage location analyzer 218 may filter the services and levels of services in the service provider compendium 208 to identify only those that provide the type of storage required for each classification of data and only those that provide the minimum level of service specified the tenant-selected parameters. Accordingly, the storage location analyzer 218 may perform separate filter operations for each different classification of data, or different combinations of such classifications, to ensure not only that storage is provided in accordance with the tenant-selected parameters, but also to ensure that certain classifications of data (e.g., data classified as high security, high value, etc.) are only designated for storage at locations that can provide the level of service (e.g., level of security, level of accessibility, etc.) required for those classifications of data.

At step 412, the storage location analyzer 218 orders the filtered services and levels of service based on how strongly they correlate to the corresponding data classifications and the tenant-selected parameters. For example, the storage location analyzer 218 may order the filtered services and levels of services based on their respective cost, size, and availability for a predetermined time period, wherein size is the minimum threshold and the other parameters are weighted based on importance. Based on that ordering, the storage location analyzer 218 may remove the services and levels of services that are least likely to satisfy the requirements of the tenant-selected parameters (e.g., those with the highest cost per unit of storage during the selected time period). Accordingly, before step 414 is performed, the storage location analyzer 218 may remove any services or levels of services from the data distribution analysis process 400 that do not provide the required level of service and that are unlikely to satisfy the tenant's preferred parameters.

In addition, by deleting certain data at step 404, or at least designating that data for deletion at step 402, the filtering and ordering operations performed at steps 410 and 412 may be simplified to exclude the services and service levels for data that does not require storage. For example, the storage location analyzer 218 may ignore all data designated for deletion at step 402 when filtering and ordering services and service levels based on different data classifications at steps 410 and 412. Thus, by performing steps 402, 410, and 412 prior to step 414, the determination made at step 414 may be simplified to include only the data that requires storage, only the services and service providers that provide storage in accordance with the remaining data classifications and the tenant's desired parameters, and only the services and service providers that are likely to provide such storage in an optimized and cost-effective manner.

At step 414, the storage location analyzer 218 determines the cost of storing and migrating data for each of the services and service offerings that remain after the filtering and ordering operations of steps 410 and 412. For example, the storage location analyzer 218 may calculate the cost of the required storage based on predetermined threshold data storage rates (e.g., Threshold=$50/month for up to 100 GB; 75 GB≤100 GB; Storage Cost=$50/month*4 months=$200) and the cost of migrating the subject data to the target location based on tiered data transfer rates (e.g., Transfer Rate=$0.15/GB for first 10 GB, $0.10/GB for next 50 GB, and $0.05/GB for next 100 GB; Transfer Cost=(10 GB×$0.15/GB)+(50 GB×$0.10/GB)+(15 GB×$0.05/GB)= $7.25) to obtain the total cost associated with storing the subject data at the target location (Total Cost=$200+ $7.25=$207.25). The storage location analyzer 218 also may calculate the cost of progressively storing data in different locations as that data is generated and different thresholds are reached, the cost of migrating data from one location to another as certain thresholds are reached, or some combination thereof.

At step 416, the storage location analyzer 218 determines where to store data based at least in part on the cost calculations performed at step 414. As discussed above, data may be designated for storage locally at the tenant system 102 or remotely at one of the service provider systems 104A-104C. For example, the classification information generated by the attribute analyzer 212 at step 312 may indicate that a first set of data requires a high level of control and/or security. The classification information generated by the attribute analyzer 212 also may indicate that a second data set is of low value and/or is used less frequently than other data sets. Accordingly, the storage location analyzer 218 may compare the cost of storing that data at the tenant system 102 with the cost of storing that same data at one of the service provider systems 104A-104C. The storage location analyzer 218 then may designate each data set for storage at the least costly of the tenant system 102 and the service provider systems 104A-104C that also provides the requisite level of control and security. For example, the storage location analyzer 218 may order the results of its cost calculations in order of least costly to most costly for predetermined thresholds of data (e.g., (1) Location A=$198.50 for 100 GB and $226.25 for 200 GB, (2) Location B=$207.25 for 100 GB and 243.75 for 300 GB, and (3) Location C=$212.75 for 100 GB and $235.25 for 250 GB) and either progressively designate data for storage in those locations from least costly to most costly as those thresholds are reached (e.g., First 100 GB to Location A→Second 100 GB to Location B→Second 100 GB to Location C), designate that data for migration between those locations as those thresholds are reached (e.g., Store First 100 GB at Location A→Migrate from Location A to Location C After 100 GB→Migrate from Location C to Location B after 250 GB), or some combination thereof.

As described above, the data distribution analyzer 202 may dynamically respond to changes in the service offerings and/or rates as they change by moving data from one service provider system 104A, 104B, or 104C to another as those changes occur. For example, a cloud IT service provider may offer a reduced rate for the first twelve (12) months of service as an incentive to purchase that particular service. Accordingly, the storage location analyzer 218 may designate all data from the corresponding service provider system 104A for migration to another service provider system 104B at step 416 when the end of that twelve-month period occurs. Those designations may be made as the need to migrate the data arises, or they may be assigned in advance and provided with a specific execution date.

As also described above, the cost of storing data at the tenant system 102 may be based on the monthly amortized cost of existing storage devices and/or storage devices that may need to be purchased, and the cost of storing data at the service provider systems 104A-104C may be based on the data storage rates and/or data transfer rates charged by the cloud IT service providers that maintain those service provider systems 104A-104C. Cost, however, is not the only factor considered by the storage location analyzer 218 when determining where data should be stored. For example, control and access to data identified as being highly confidential and having significant value may override the cost factor in certain circumstances. Accordingly, the storage location analyzer 218 then may determine that it is optimal to store certain data at the tenant system 102 because the tenant system 102 is the only system that provides the requisite level of control, even if it would be less costly to store the data at one of the service provider systems 104A-104C. Similarly, where other data does not require that level of control, the storage location analyzer 218 may determine that it is optimal to store that other data at the second service provider system 104B because storage at that location is the least costly. Accordingly, the storage location analyzer 218 may optimize the placement of data as required to balance the business value of the data with the cost of storing that data.

At step 418, the data migration engine 220 migrates data based on the designations assigned to that data by the storage location analyzer 218 at step 416. That migration may occur immediately, as the designation is assigned to a datum at step 416, or it may be performed in batch mode, after a predetermined amount of data has been assigned new designations at step 416. For example, the data migration engine 220 may migrate data progressively from the first service provider system 104A to the second service provider system 104B and/or third service provider system 104C as each datum is assigned a new location designation at step 416, or the data migration engine 220 may wait until an entire set of data has been assigned new designations at step 416 and then migrate that set of data from the first service provider system 104A to the second service provider system 104B and/or third service provider system 104C at step 418 only after all of that data has been assigned its new designations at step 416. Accordingly, step 418 may occur both during and after step 416. Step 418 also may be delayed until certain conditions are met, such as reaching the date that a particular service must be renewed.

As depicted by the arrow extending from step 418 back to step 410 in FIG. 4, steps 410-418 may be repeated any time the classifications of data change at step 312, the requirements of the tenant change at step 406, and/or the service offerings of the cloud IT service providers change at step 408. And each times steps 410-418 are repeated, the storage location analyzer 218 may learn from its previous loop to help improve the accuracy of its analyses. For example, the storage location analyzer 218 may learn whether certain cost predictions were correct and adjust subsequent cost predictions accordingly. The storage location analyzer 218 also may learn from proactive approval processes and/or post-placement feedback audits, which may be performed by obtaining input from the tenant via the user preference portal 216.

Similarly, steps 302-312 may be repeated in a cyclical manner each time data is generated, modified, and/or accessed in the cloud IT service solution 100 because each such action may result in a change in the classification of that data and/or some other data. And steps 402-418 may be repeated each time steps 302-312 are repeated, as part of the process for optimizing the placement of data 300. In that manner, the disclosed embodiments may autonomically optimize the placement of data in real time as data changes and as service offerings and/or rates change, thereby reducing the immediate and long-term costs associated with storing that data as well as eliminating the need to manually sift through that data to determine its placement.

The schematic, block, and flow diagrams in FIGS. 1-4 illustrate the architecture, functionality, and operation of possible implementations of systems, methods, apparatuses, and computer program products according to various aspects of the present disclosure. In that regard, each block in the flow and block diagrams may represent a module, segment, or portion of code, which comprises one or more executable instructions for implementing the specified logical function(s). It should also be noted that, in some alternative implementations, the functions noted in a block may occur out of the order noted in the figures. In FIGS. 3 and 4, for example, two blocks shown in succession may, in fact, be executed substantially concurrently, or the blocks may sometimes be executed in the reverse order, depending upon the functionality involved. It will also be noted that each block of the block and flow diagrams, and combinations of blocks in the block and flow diagrams, may be implemented by special purpose hardware-based systems that perform the specified functions or acts, or combinations of special purpose hardware and computer instructions.

In addition, although each of the process steps 302-312 and 402-418 depicted in FIGS. 3 and 4, respectively, is described as being performed on or by specific elements of the cloud IT service solution 100 depicted in FIG. 1 and the tenant system 102 depicted in FIG. 2, it should be understood that those process steps 302-312 and 402-418 are not limited to being performed by those specific elements. Instead, the foregoing description of the process for optimizing the placement of data 300 and the data distribution analysis process 400 is intended to be illustrative only, and the references to specific elements of the cloud IT service solution 100 depicted in FIG. 1 and the tenant system 102 in FIG. 2 are solely for the purpose of illustration. Thus, it should be understood that the process steps 302-312 and 402-418 depicted in FIGS. 3 and 4, respectively, also may be performed by any other suitable element and/or device.

The terminology used herein is for the purpose of describing particular aspects of the disclosed embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The descriptions of the system, method, apparatus, and computer program product of the present disclosure have been presented for purposes of illustration, but are not intended to be exhaustive or to limit the system, method, apparatus, and computer program product to the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
   compiling operational information for a plurality of service offerings, the plurality of service offerings being configured to provide data storage at a plurality of storage locations on a network;
   determining a cost of migrating each of a plurality of data to each of the plurality of storage locations utilizing the operational information;
   determining a cost of storing each of the plurality of data at each of the plurality of storage locations utilizing the operational information;
   designating at which of the plurality of storage locations each of the plurality of data is to be stored based on the cost of migrating each of a plurality of data to each of the plurality of storage locations and the cost of storing each of the plurality of data at each of the plurality of storage locations;

migrating at least one of the plurality of data from a first location of the plurality of storage locations to a second location of the plurality of storage locations in response to determining that the cost of continuing to store the at least one data at the first storage location is greater than the cost of migrating the at least one data to the second storage location and the cost of storing the at least one data at the second storage location;

wherein the plurality of storage locations comprise the first location, the second location, and a third location;

designating the at least one data for storage at the first location until a first storage volume is reached;

designating the at least one data for storage at a second location after the first storage volume is reached and until a second storage volume is reached;

designating the at least one data for storage at the third location after the second storage volume is reached; and wherein it is more costly to migrate the at least one data to and store the at least one data at the first location than the second location after the first storage volume is reached, and it is more costly to migrate the at least one data to and store the at least one data at the second location than the third location after the second storage volume is reached.

2. The method of claim 1, further comprising:
determining a relationship each of the plurality of data has with at least one other data from among the plurality of data; and
assigning a classification to each of the plurality of data utilizing content extracted from each of the plurality of data and the relationship determined for each of the plurality of data,
wherein designating which of the plurality of locations each of the plurality of data is to be stored also is based on the classification of each of the plurality of data.

3. The method of claim 1, further comprising:
storing a first set of data from the plurality of data at the first location;
determining that it is less costly to migrate the first set of data and store the first set of data at a second location from among the plurality of locations than at the first location after a predetermined storage threshold is reached at the first location;
designating the first set of data for migration from the first location to the second location when the predetermined storage threshold is reached; and
designating a second set of data from the plurality of data for storage at the second location after the predetermined storage threshold is reached.

4. The method of claim 1, further comprising:
gathering user preferences for receiving service offerings via a user preference portal; and
filtering out, from the plurality of service offerings, a service offering that does not provide services in accordance with the user preferences,
wherein determining the cost of storing each of the plurality of data at each of the plurality of storage locations comprises excluding the service offering that is filtered out from the plurality of service offerings.

5. The method of claim 1, further comprising:
abstracting the plurality of service offerings as a single service;
gathering user preferences for receiving the single service via a user preference portal; and
migrating data from the first location to the second location in the background of the single service.

6. The method of claim 1, wherein determining the cost of storing each of the plurality of data at each of the plurality of storage locations comprises determining the cost of storing the at least one data at one location of the plurality of storage locations by determining the cost of amortizing storage devices at that one storage location.

7. A non-transitory computer program product that is configured to be executed by a processor, the computer program product comprising:
computer-readable program code configured to compile operational information for a plurality of service offerings, the plurality of service offerings being configured to provide data storage at a plurality of storage locations on a network;
computer-readable program code configured to determine a cost of migrating each of a plurality of data to each of the plurality of storage locations utilizing the operational information;
computer-readable program code configured to determine a cost of storing each of the plurality of data at each of the plurality of storage locations utilizing the operational information;
computer-readable program code configured to designate at which of the plurality of storage locations each of the plurality of data is to be stored based on the cost of migrating each of a plurality of data to each of the plurality of storage locations and the cost of storing each of the plurality of data at each of the plurality of storage locations;
computer-readable program code configured to designate at least one of the plurality of data for migration from a first location of the plurality of storage locations to a second location of the plurality of storage locations if the cost of continuing to store the at least one data at the first storage location is determined to be greater than the cost of migrating the at least one data to the second storage location and the cost of storing the at least one data at the second storage location;
wherein the plurality of storage locations comprise the first location, the second location, and a third location:
computer-readable program code configured to designate the at least one data for storage at the first location until a first storage volume is reached,
computer-readable program code configured to designate the at least one data for storage at a second location after the first storage volume is reached and until a second storage volume is reached, and
computer-readable program code configured to designate the at least one data for storage at the third location after the second storage volume is reached;
wherein it is more costly to migrate the at least one data to and store the at least one data at the first location than the second location after the first storage volume is reached; and
wherein it is more costly to migrate the at least one data to and store the at least one data at the second location than the third location after the second storage volume is reached.

8. The non-transitory computer program product of claim 7, further comprising:

computer-readable program code configured to determine a relationship each of the plurality of data has with at least one other data from among the plurality of data; and computer-readable program code configured to assign a classification to each of the plurality of data utilizing content extracted from each of the plurality of data and the relationship determined for each of the plurality of data, wherein the computer-readable program code configured to designate at which of the plurality of locations each of the plurality of data is to be stored also bases its designation on the classification of each of the plurality of data.

9. The non-transitory computer program product of claim 7, further comprising:

computer-readable program code configured to store a first set of data from the plurality of data at the first location;

computer-readable program code configured to designate the first set of data for migration from the first location to the second location when:

it is determined that it is less costly to migrate the first set of data and store the first set of data at a second location from among the plurality of locations than at the first location after a predetermined storage threshold is reached at the first location, and the predetermined storage threshold is reached; and computer-readable program code configured to designate a second set of data from the plurality of data for storage at the second location after the predetermined storage threshold is reached.

10. The non-transitory computer program product of claim 7, further comprising:

computer-readable program code configured to gather user preferences for receiving service offerings; and computer-readable program code configured to filter out, from the plurality of service offerings, a service offering that does not provide services in accordance with the user preferences, wherein the computer-readable program code configured to determine the cost of storing each of the plurality of data at each of the plurality of storage locations is configured to exclude the service offering that is filtered out from the plurality of service offerings.

11. The non-transitory computer program product of claim 7, further comprising:

computer-readable program code configured to abstract the plurality of service offerings as a single service; and computer-readable program code configured to gather user preferences for receiving the single service, wherein the computer-readable program code configured to designate at least one of the plurality of data for migration is configured to migrate data the first location to the second location in the background of the single service.

12. The non-transitory computer program product of claim 7, wherein the computer-readable program code configured to determine the cost of storing each of the plurality of data at each of the plurality of storage locations is configured to determine the cost of storing the at least one data at one storage location of the plurality of storage locations based on the cost of amortizing storage devices at that one storage location.

13. An apparatus comprising:

computer-readable program code embodied on a computer program product; and a processor configured to execute the computer-readable program code, wherein, when the processor executes the computer-readable program code, the apparatus is configured to:

compile operational information for a plurality of service offerings, the plurality of service offerings being configured to provide data storage at a plurality of storage locations on a network;

determine a cost of migrating each of a plurality of data to each of the plurality of storage locations utilizing the operational information;

determine a cost of storing each of the plurality of data at each of the plurality of storage locations utilizing the operational information;

designate at which of the plurality of storage locations each of the plurality of data is to be stored based on the cost of migrating each of a plurality of data to each of the plurality of storage locations and the cost of storing each of the plurality of data at each of the plurality of storage locations;

migrate at least one of the plurality of data from a first location of the plurality of storage locations to a second location of the plurality of storage locations if the cost of continuing to store the at least one data at the first storage location is determined to be greater than the cost of migrating the at least one data to the second storage location and the cost of storing the at least one data at the second storage location;

wherein the plurality of storage locations comprise the first location, the second location, and a third location:

designate the at least one data for storage at the first location until a first storage volume is reached, designate the at least one data for storage at a second location after the first storage threshold is reached and until a second storage volume is reached, and designate the at least one data for storage at the third location after the second volume threshold is reached:

wherein it is more costly to migrate the at least one data to and store the at least one data at the first location than the second location after the first storage volume is reached; and wherein it is more costly to migrate the at least one data to and store the at least one data at the second location than the third location after the second storage volume is reached.

14. The apparatus of claim 13, wherein, when the processor executes the computer-readable program code, the apparatus is further configured to:

determine a relationship each of the plurality of data has with at least one other data from among the plurality of data; and assign a classification to each of the plurality of data utilizing content extracted from each of the plurality of data and the relationship determined for each of the plurality of data, wherein designating which of the plurality of locations each of the plurality of data is to be stored also is based on the classification of each of the plurality of data.

15. The apparatus of claim 13, wherein, when the processor executes the computer-readable program code, the apparatus is further configured to:

store a first set of data from the plurality of data at the first location;

determine that it is less costly to migrate the first set of data and store the first set of data at a second location from among the plurality of locations than at the first location after a predetermined storage threshold is reached at the first location;

designate the first set of data for migration from the first location to the second location when the predetermined storage threshold is reached; and designate a second set of data from the plurality of data for storage at the second location after the predetermined storage threshold is reached.

16. The apparatus of claim 13, wherein, when the processor executes the computer-readable program code, the apparatus is further configured to:

gather user preferences for receiving service offerings via a user preference portal;

filter out, from the plurality of service offerings, a service offering that does not provide services in accordance with the user preferences; and when determining the cost of storing each of the plurality of data at each of the plurality of storage locations, exclude the service offering that is filtered out from the plurality of service offerings.

17. The apparatus of claim 13, wherein, when the processor executes the computer-readable program code, the apparatus is further configured to:

abstract the plurality of service offerings as a single service;

gather user preferences for receiving the single service via a user preference portal; and migrate data from the first location to the second location in the background of the single service.

18. The apparatus of claim 13, wherein determining the cost of storing each of the plurality of data each of the plurality of storage locations comprises determining the cost of storing the at least one data at one storage location of the plurality of storage locations based on the cost of amortizing storage devices at that one storage location.

* * * * *